April 7, 1925.

F. Y. SUNDERLAND

ARTIFICIAL EYE

Filed Feb. 21, 1924

1,532,455

Inventor

Fernando Yuart Sunderland,

By Homer C. Underwood

Attorney

Patented Apr. 7, 1925.

1,532,455

UNITED STATES PATENT OFFICE.

FERNANDO YUART SUNDERLAND, OF DETROIT, MICHIGAN.

ARTIFICIAL EYE.

Application filed February 21, 1924. Serial No. 694,209.

*To all whom it may concern:*

Be it known that I, FERNANDO YUART SUNDERLAND, a subject of the King of England, residing in the city of Detroit, county of Wayne, and State of Michigan, have invented certain new and useful Improvements in Artificial Eyes, of which the following is a specification.

My invention relates to improvements in artificial eyes and has for its object to provide an artificial lens to focus rays of light on the retina of the human eye where the lens which nature provided has been injured, removed, or is so defective as to destroy the capability of its possessor to see.

The sense of sight is produced by rays of light focused on the retina of the human eye by means of a lens which nature has provided in every normal eye. In many, if not most cases of blindness, the retina of the eye is normal, and if a proper lens is provided, a person otherwise blind can see, the sense of sight being the result of rays of light focused on the retina. The human eye is provided with a crystalline lens, hence I have adopted this form of lens as most suitable for my purposes, and I propose to provide such a lens to take the place of the natural lens for limited uses. It is apparent that an artificial lens will not have the accommodation for focusing such as is provided in the structure of the natural eye, but it will, nevertheless, within a certain range, focus light upon the retina and partially restore the sense of sight.

With the foregoing and other objects in view, I will not describe the means by which these objects are attained, referring to the drawings forming a part of my specification, and using reference numerals to indicate the several parts.

Figure 3:
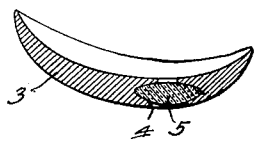
Fig. 3, is a section of Fig. 2, showing my lens embedded in the shell.
Figure 5:
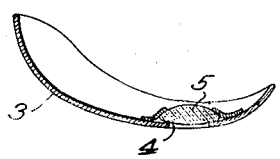
Fig. 5, is a section of Fig. 4 showing my lens secured on the inner side of the shell.

In the accompanying drawings, 1 is the retina of the normal human eye, and is an expansion of the optic nerve 2. A shell 3 is formed of material such as is commonly used in making artificial eyes now in use and is made to conform to the shape of the eye. The shell 3 is provided with an aperture 4 for the purpose of admitting rays of light through the shell. A crystalline lens 5 is secured to the shell 3 in any suitable manner, or imbedded therein as shown in Fig. 3, but so placed in relation to the aperture 4 as to require the rays of light passing through said aperture to pass through the lens and from thence to the retina 1.

Figure 1:
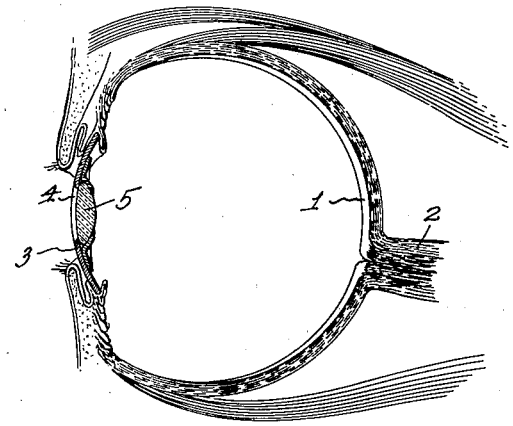
Fig. 1, is a section of the human eye and of my artificial eye secured in front of the eye-ball.
Figure 2:
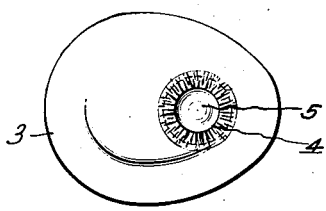
Fig. 2, is an elevation of one form of my device showing its external appearance.
Figure 4:
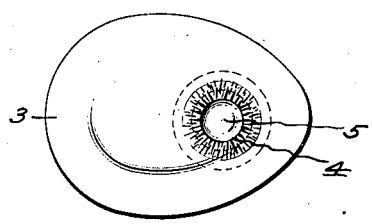
Fig. 4, is an elevation of another form of my device, having the same external appearance as Fig. 2.

The outer surface of the shell as shown in Figs. 2 and 4, may be artistically made to imitate the appearance of a natural eye. The shell is secured to the eye in the same manner now commonly employed in securing artificial eyes to the person.

From the foregoing description and drawings the operation of my device will be readily understood. Rays of light will enter the aperture 4, pass through the lens 5 and the lens will spread the light upon the retina, and produce the sense of sight.

Having fully described my invention and its mode of operation, what I claim is:

1. In an artificial eye, an apertured shell corresponding in shape to the outward surface of the human eye, and a lens so positioned with respect to the aperture as to require rays of light which enter the aperture to pass through the lens.

2. In an artificial eye, an apertured shell corresponding in shape to the outward surface of the human eye, and a crystalline lens so positioned with respect to said aperture as to require rays of light which enter the aperture to pass through said lens.

Signed at the city of Detroit, county of Wayne and State of Michigan, this 18th day of February, 1924.

FERNANDO YUART SUNDERLAND.

Witnesses:
 IRENE A. BRUNGART,
 A. E. HONEY.